US012242012B2

(12) United States Patent
Gelineau et al.

(10) Patent No.: US 12,242,012 B2
(45) Date of Patent: Mar. 4, 2025

(54) FIELD INSTALLABLE LASER ALIGNMENT TOOL

(71) Applicant: Banner Engineering Corp., Minneapolis, MN (US)

(72) Inventors: Matthew Michael Gelineau, Minneapolis, MN (US); John Klesk, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 201 days.

(21) Appl. No.: 17/812,925

(22) Filed: Jul. 15, 2022

(65) Prior Publication Data
US 2023/0052882 A1 Feb. 16, 2023

Related U.S. Application Data

(60) Provisional application No. 63/260,175, filed on Aug. 11, 2021.

(51) Int. Cl.
*G01V 13/00* (2006.01)
*F16P 3/14* (2006.01)
(Continued)

(52) U.S. Cl.
CPC .............. *G01V 13/00* (2013.01); *F16P 3/144* (2013.01); *G01V 8/20* (2013.01); *G08B 21/18* (2013.01)

(58) Field of Classification Search
CPC ........... G01V 13/00; G01V 8/20; F16P 3/144; G08B 21/18; G01B 11/27
See application file for complete search history.

(56) References Cited

U.S. PATENT DOCUMENTS 7,326,914 B2 * 2/2008 Pirkl ........................ G01V 8/20
250/221
8,866,169 B2 10/2014 Emerson et al.
(Continued)

FOREIGN PATENT DOCUMENTS

DE 202010008137 U1 11/2011
EP 0728292 A1 8/1996
(Continued)

OTHER PUBLICATIONS

Written Opinion of the International Preliminary Examining Authority in related International Application No. PCT/US2022/073804, dated Jul. 21, 2023, 7 pages.
(Continued)

*Primary Examiner* — Seung C Sohn
(74) *Attorney, Agent, or Firm* — Thompson Patent Law Offices PC

(57) ABSTRACT

Apparatus and associated methods relate to an alignment system including an alignment source module (ASM) and an alignment indicator module (AIM) configured to be releasably coupled to a first unit and a second unit, respectively, of a pair of optoelectronic arrays. In an illustrative example, the ASM may be oriented, when coupled, to emit an optical beam in substantial alignment with a first optical axis of the first unit. The AIM may, for example, be configured, when coupled, to provide a visible indication when the optical beam is within a predetermined near-alignment orientation range relative to a second optical axis of the second unit. Each of the AIM and the ASM may, for example, be configured to axially couple along respective longitudinal axes of the first unit and the second. Various embodiments may advantageously facilitate manipulation of the pair of optoelectronic arrays into near alignment with each other.

21 Claims, 14 Drawing Sheets

(51) Int. Cl.
*G01V 8/20* (2006.01)
*G08B 21/18* (2006.01)

(56) References Cited

U.S. PATENT DOCUMENTS

| | | | |
|---|---|---|---|
| 9,217,630 | B2 | 12/2015 | Meinherz et al. |
| 9,503,184 | B2 * | 11/2016 | Grimm ............. H04B 10/1143 |
| 9,870,681 | B2 | 1/2018 | Gelineau et al. |
| 2004/0042010 | A1 | 3/2004 | Wuestefeld |
| 2013/0201480 | A1 | 8/2013 | Meinherz et al. |
| 2016/0043801 | A1 | 2/2016 | Grimm et al. |

FOREIGN PATENT DOCUMENTS

| | | | |
|---|---|---|---|
| EP | 0964273 | A2 | 12/1999 |
| EP | 0964273 | A3 | 10/2000 |
| EP | 1437542 | A1 | 7/2004 |
| WO | 2017023942 | A1 | 2/2017 |

OTHER PUBLICATIONS

Chapter II Demand filed with the International Preliminary Examining Authority on Jun. 2, 2023 in Application No. PCT/2022/073804, 13 pages.

Informal Communication mailed Nov. 15, 2023, issued by the International Preliminary Examining Authority in Application No. PCT/US2022/073804, 4 pages.

IPRP mailed Nov. 28, 2023, issued by the European Patent Office in Application No. PCT/US2022/073804, 7 pages.

Response to Minutes with Replacement Claims filed Oct. 30, 2023 with the International Preliminary Examining Authority in Application No. PCT/US22/73804, 18 pages.

Response to Written Opinion to Accompany Art. 34 Amendments, filed Sep. 19, 2023 with the International preliminary Examining Authority in Application No. PCT/US22/73804, 18 pages.

ABB Jobak Safety, Original Instructions: Orion1 Extended: Safety Light Curtains; Manual, 2015, retrieved from the internet, <https://library.e.abb.com/public/fd0b1918e09941ca9ef61d7cc0d40569/Orion1%20Extended%20Manual%20(English)_ABB_%20rev%20B_150918.pdf>.

Automation Direct, Contrinex Safety Light Curtains Accessories, retrieved from the internet, <https://cdn.automationdirect.com/static/specs/safetylightcurtainacc.pdf>.

Banner Engineering Corp., LAT-1-x Laser Alignment Tool; Data Sheet; 2016, retrieved from the internet, <https://www.alliedelec.com/m/d/9fb4fb856748decdeb515db06fba27c1.pdf>.

Contrinex, AG Industrielle Elektronik. Mounting Instructions for YCA Devices Combined with Device Columns and Mirror Columns; Manual, 2010, retrieved from the internet, <https://cdn.automationdirect.com/static/manuals/safetycurtaininserts/yca_mounting.pdf>.

Sick AG, The deTec4 Prime Safety Light Curtain Provides Reliable Protection Even in the Toughest Environments, Feb. 4, 2016, retrieved from the internet, <https://www.sick.com/us/en/the-detec4-prime-safety-light-curtain-provides-reliable-protection-even-in-the-toughest-environments-/w/press-detec4-prime/>.

International Search Report and Written Opinion of the International Searching Authority in related International Application No. PCT/US2022/073804, dated Nov. 11, 2022, 12 pages.

* cited by examiner

FIELD INSTALLABLE LASER ALIGNMENT TOOL

CROSS-REFERENCE TO RELATED APPLICATIONS

This application claims the benefit of U.S. Provisional Application Ser. No. 63/260,175, titled "Field Installable Laser Alignment Tool," filed by Matthew Michael Gelineau, et al., on Aug. 11, 2021.

This application incorporates the entire contents of the foregoing application(s) herein by reference.

The subject matter of this application may have common inventorship with and/or may be related to the subject matter of the following:

- U.S. application Ser. No. 15/494,415, titled "Field Installable Light Curtain Status Module," filed by Matthew Michael Gelineau, et al., on Apr. 21, 2017, and issued as U.S. Pat. No. 9,870,681 on Jan. 16, 2018;
- U.S. application Ser. No. 14/819,264, titled "Field Installable Light Curtain Status Module," filed by Matthew Michael Gelineau, et al., on Aug. 5, 2015, and issued as U.S. Pat. No. 9,671,523 on Jun. 6, 2017;
- U.S. application Ser. No. 14/947,377, titled "User Selectable Remote Programming for Cascade-Connected Light Curtains," filed by Matthew Michael Gelineau, et al., on Nov. 20, 2015, and issued as U.S. patent Ser. No. 10/459,113 on Oct. 29, 2019; and
- PCT Application Serial No. PCT/US16/45179, titled "Field Installable Light Curtain Status Module," filed by Matthew Michael Gelineau, et al., on Aug. 2, 2016.

This application incorporates the entire contents of the foregoing application(s) herein by reference.

TECHNICAL FIELD

Various embodiments relate generally to alignment of electronic sensing apparatus.

BACKGROUND

Manufacturing facilities produce useful articles by processing components into finished goods. The operations used to process the components may involve transformational steps that change the article from one state to another. Some of these transformational operations employ machineries, such as presses, cutting tools, conveyor systems, ovens, or chemical applicators, for example.

Some manufacturing facilities use machinery that can be dangerous to humans. For example, a worker who walks into a zone of operation of a large robotic arm is at risk of serious bodily harm if the arm's motion profile intersects the worker's body or clothing. In another example, a worker who places a workpiece in a press and reaches into the press while the press is activated could be severely injured.

To promote safety for operators and machines, many manufacturing machines are protected, either partially or entirely surrounded by light curtain systems. A light curtain safety system may cause a machine to be deactivated when an object interrupts any portion of the light curtain sensing zone. For example, a hand extending through the curtain of light may block one or more beams of the light curtain, which the light curtain may interpret as a potential danger condition. The light curtain may typically respond by causing the machine to be deactivated by, for example, engaging a braking system and/or interrupting electric power to motor drives that cause a press to move. A light curtain safety system may also prevent a machine from being activated when an object is present in any portion of the light curtain sensing zone. For example, prior to machine startup, an operator who is standing too close, or within hazardous proximity, to a machine may block one or more beams of the light curtain. The light curtain may interpret this as a danger condition and prevent machine startup.

SUMMARY

Apparatus and associated methods relate to an alignment system including an alignment source module (ASM) and an alignment indicator module (AIM) configured to be releasably coupled to a first unit and a second unit, respectively, of a pair of optoelectronic arrays. In an illustrative example, the ASM may be oriented, when coupled, to emit an optical beam in substantial alignment with a first optical axis of the first unit. The AIM may, for example, be configured, when coupled, to provide a visible indication when the optical beam is within a predetermined near-alignment orientation range relative to a second optical axis of the second unit. Each of the AIM and the ASM may, for example, be configured to axially couple along respective longitudinal axes of the first unit and the second. Various embodiments may advantageously facilitate manipulation of the pair of optoelectronic arrays into near alignment with each other.

Various embodiments may achieve one or more advantages. For example, some embodiments may advantageously facilitate an operator(s) in manipulating a first unit and/or second unit of a pair of optoelectronic arrays into an (near) alignment state in which a curtain of light may be generated and/or in which an automatic alignment system may be advantageously employed. Some embodiments may, for example, advantageously actively generate one or more visual indicia such as, for example, to guide a user in alignment of one or more units. Various embodiments may advantageously provide for rapid, guided alignment of two optoelectronic units without undue and/or frustrating 'guesswork' manipulation trying to achieve a (predetermined) level of alignment suitable for alignment and/or for performing a final (precision) alignment method.

In various embodiments, an alignment module may, for example, be advantageously pluggably and releasably coupled into a desired orientation for alignment. Various embodiments may, for example, advantageously provide axial coupling of a pluggable alignment module to an end of a light stick. Such embodiments may, for example, advantageously prevent obstruction of one or more elements of an optoelectronic array(s) of the light stick.

A light stick may, for example, include an array of optical emitting elements. The light stick may, for example, extend along a longitudinal axis. The optical emitting elements may, for example, be distributed along an array axis parallel to the longitudinal axis. The optical emitting elements may, for example, emit light in at least one plane substantially orthogonal to the array axis. The light stick may, for example, be provided with one or more optical receivers. The receivers may, for example, be distributed along a second array axis substantially parallel to the longitudinal axis. The receivers may, for example, be configured to detect light incoming in one or more planes substantially orthogonal to the second array axis.

Various embodiments may, for example, advantageously disable a touch input such that accidental activation of an emitter may be advantageously prevented. Some embodiments may, for example, advantageously provide pluggable cascading of optoelectronic units.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary pluggable alignment system is introduced with reference to FIG. 1. Second, that introduction leads into a description with reference to FIGS. 2-3 of exemplary system embodiments. Third, with reference to FIGS. 4-12, exemplary pluggable alignment modules are depicted. Fourth, with reference to FIGS. 13-14 exemplary methods related to operating a pluggable alignment module are discussed. Finally, the document discusses further embodiments, exemplary applications and aspects relating to pluggable alignment systems.

Figure 1:
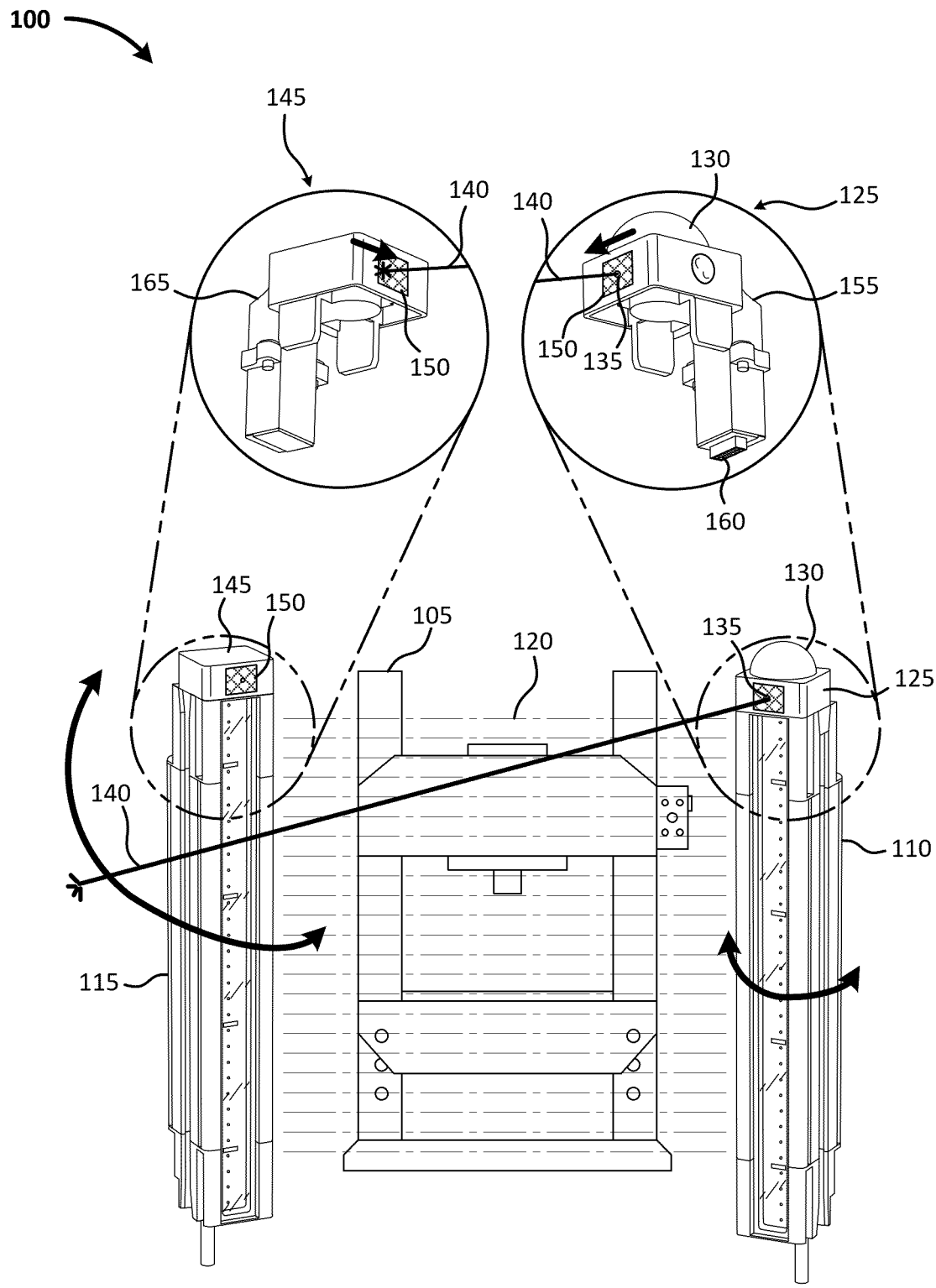
FIG. 1 depicts an exemplary pluggable alignment module (PAM) employed in an illustrative use-case scenario.

FIG. 1 depicts an exemplary pluggable alignment module (PAM) employed in an illustrative use-case scenario. In a depicted exemplary scenario 100, a machine 105 (e.g., a hydraulic press) is deployed (e.g., on a shop floor). The machine 105 may, for example, require safeguarding. For example, the machine 105 may be safeguarded to avoid injury to workers working with the machine 105. In this example, an optoelectronic safety guard (e.g., pair of light sticks) is being installed to safeguard the machine 105. The optoelectronic safety guard includes a first unit 110 and a second unit 115. The first unit 110 and the second unit 115 are being configured to generate a curtain of light 120. Upon successful installation, the curtain of light 120 may, for example, be configured such that an operation of the machine 105 is stopped upon interruption of the curtain of light 120.

Operations of the optoelectronic safety guard may, for example, depend upon proper alignment of the first unit 110 and/or the second unit 115. For example, the curtain of light 120 may be generated only upon registration of an optoelectronic array (e.g., sensors, emitters) of the first unit 110 with an optoelectronic array of the second unit 115. The first unit 110 and/or the second unit 115 may, for example, be pre-aligned by an operator. The pre-alignment may, by way of example and not limitation, include using a level, visual alignment (e.g., by an unaided human eye) of the first unit 110 and/or second unit 115 with each other, or some combination thereof. The first unit 110 and/or the second unit 115 may, by way of example and not limitation, include an automatic alignment system to precisely align the first unit 110 and/or second unit 115 with each other. The automatic alignment system may, for example, require a minimum threshold of alignment to be successfully employed. For example, the automatic alignment system may require that the first unit 110 and/or the second unit 115 be within a (predetermined) angle range (e.g., 'near-alignment') about a longitudinal axis of a corresponding optoelectronic array. The automatic alignment system may, for example, require a minimum angle of alignment (e.g., from parallel) between a longitudinal axis of the first unit 110 and a longitudinal axis of the second unit 115. The minimum alignment may, for example, be difficult to achieve by unaided visual alignment of the first unit 110 and/or the second unit 115 (e.g., by 'eyeballing' the alignment) and/or by external alignment tools.

In the depicted exemplary scenario 100, the first unit 110 is provided with a first pluggable alignment module 125. The first pluggable alignment module 125 is (pluggably and/or releasably) coupled to an end of the first unit 110 along a longitudinal axis of the first unit 110. The first pluggable alignment module 125 is provided with a touch input and indication module 130. An emitter 135 emits an optical beam 140 (e.g., laser beam). The first pluggable alignment module 125 is coupled to the first unit 110 such that the emitter 135 emits the optical beam 140 substantially parallel to an optical axis of the optoelectronic array of the first unit 110.

A second pluggable alignment module 145 is (releasably and pluggably) coupled to the second unit 115. In the depicted example, the second pluggable alignment module 145 includes an indicator module 150. The indicator module 150 may, for example, be at least partially made of a material having a reflective surface. As depicted, the first unit 110 is being rotated, thereby rotating the optical beam 140. The reflective surface may, for example, generate at least one visual indicium upon the optical beam 140 impinging upon the indicator module 150. The visual indicium may, for example, indicate that the first unit 110 and/or the second unit 115 are in near alignment with one another. For example, the visual indicium may indicate that respective longitudinal axes of the first unit 110 and the second unit 115 are in near parallel alignment and/or that optical axes of the first unit 110 and the second unit 115 are in near parallel alignment. Accordingly, an operator(s) may advantageously manipulate the first unit 110 and/or second unit 115 into an (near) alignment state in which the curtain of light 120 may be generated and/or in which an automatic alignment system may be advantageously employed.

In the depicted example, the first pluggable alignment module 125 further includes a coupling module 155 having a plug module 160. The coupling module 155 may be configured to align and releasably couple the first pluggable alignment module 125 to an end of the first unit 110 along the longitudinal axis of the first unit 110. The coupling module 155 may be configured, for example, to rotationally orient the first pluggable alignment module 125 about the longitudinal axis. The plug module 160 may electrically couple the first pluggable alignment module 125 to the first unit 110. For example, the plug module 160 may operably couple the emitter 135 to a power source of the first unit 110.

As depicted, the first pluggable alignment module 125 further includes an indicator module 150. The indicator module 150 may, for example, be configured to generate at least one visual indicium in response to an impinging light (e.g., laser beam) from an opposing alignment module. For example, in some embodiments, the second pluggable alignment module 145 may be provided with an emitter 135 (not shown in the depicted example). Such embodiments may, for example, advantageously permit more accurate alignment of the second unit 115 with the first unit 110. For example, the first unit 110 and the second unit 115 may be each repeatedly aligned in successive turns until the optical beam 140 and an optical beam launched from the second pluggable alignment module 145 are each in alignment with a (predetermined) target (e.g., a center, a visible hole for the emitter 135) of the opposing alignment module.

In the depicted example, the second pluggable alignment module 145 is provided with a coupling module 165. The coupling module 165, as depicted, is not provided with a plug module 160. Embodiments without a plug may, for example, not have an emitter 135. Embodiments without a plug may, for example, have another source of electrical power. Such embodiments may, by way of example and not limitation, have an internal power source (e.g., rechargeable and/or replaceable battery), solar power, external electrical coupling such as a cord and plug, or some combination thereof.

Figure 2:
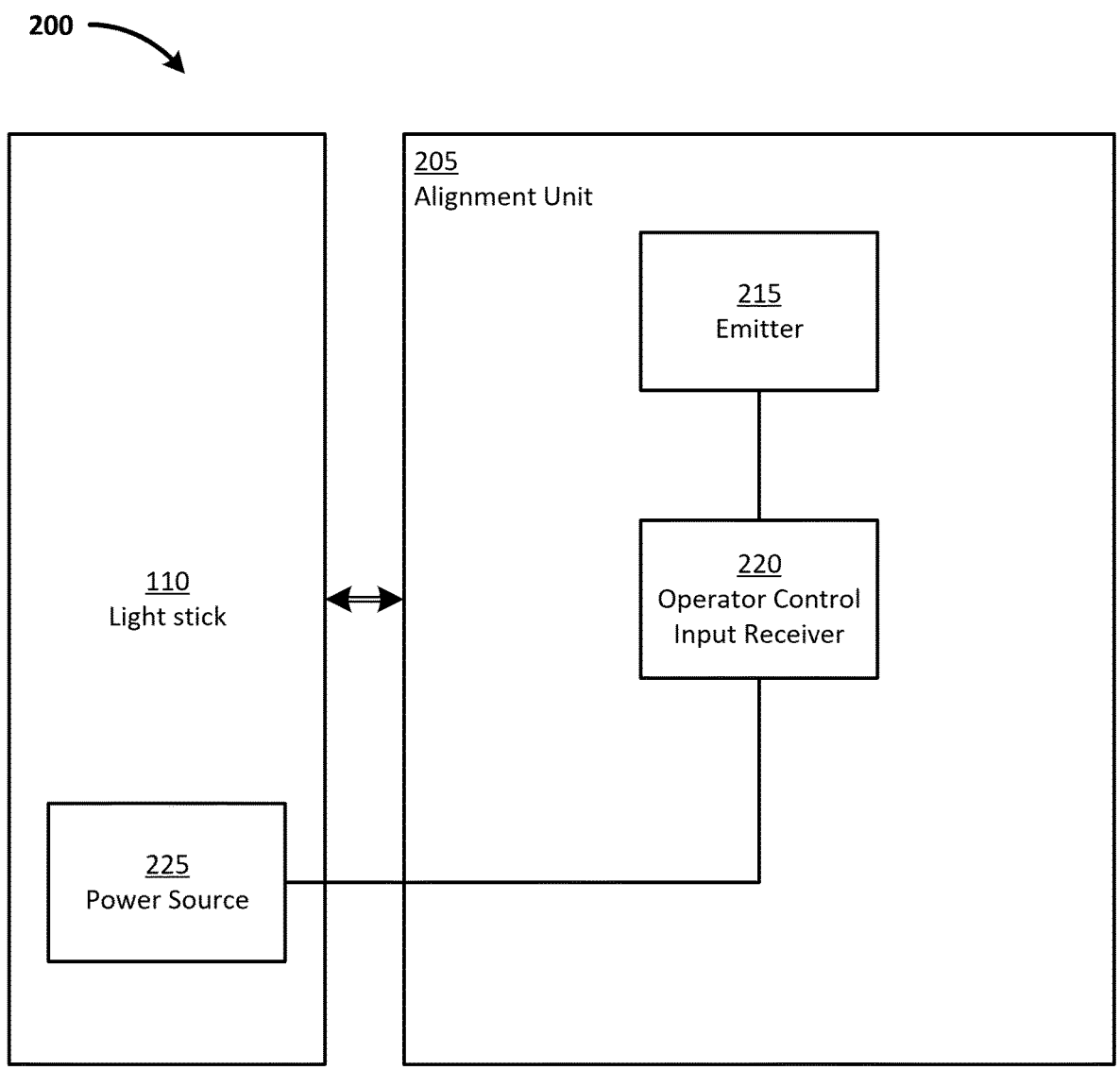
FIG. 2 depicts an exemplary block diagram of an exemplary PAM.

FIG. 2 depicts an exemplary block diagram of an exemplary PAM. An exemplary pluggable alignment system 200 includes an alignment unit 205 coupled to an optoelectronics unit. In the depicted example, the optoelectronics unit is the first unit 110 (labeled as a 'light stick'). The alignment unit 205 includes an emitter 215. The emitter 215 is operably electrically coupled to an operator control input receiver 220. The operator control input receiver 220 may, for example, include a switch. An operator may, for example, operate the operator control input receiver 220 to enable and/or disable the emitter 215.

The first unit 110 includes a power source 225. The power source 225 may, for example, include an internal power source (e.g., a battery). The power source 225 may, for example, include an external power source (e.g., building power such as accessed by a pluggable connection with an electrical receptacle in a building). The first unit 110 may, for example, include a power control circuit configured to modify, condition, and/or distribute power from an internal and/or external power source.

The alignment unit 205 is mechanically (e.g., releasably, pluggably) coupled to the first unit 110, as depicted by a double line. The operator control input receiver 220 operably (electrically) couples the power source 225 of the first unit 110 to the emitter 215. Accordingly, the emitter 215 may selectively receive power from the power source 225.

Figure 3:
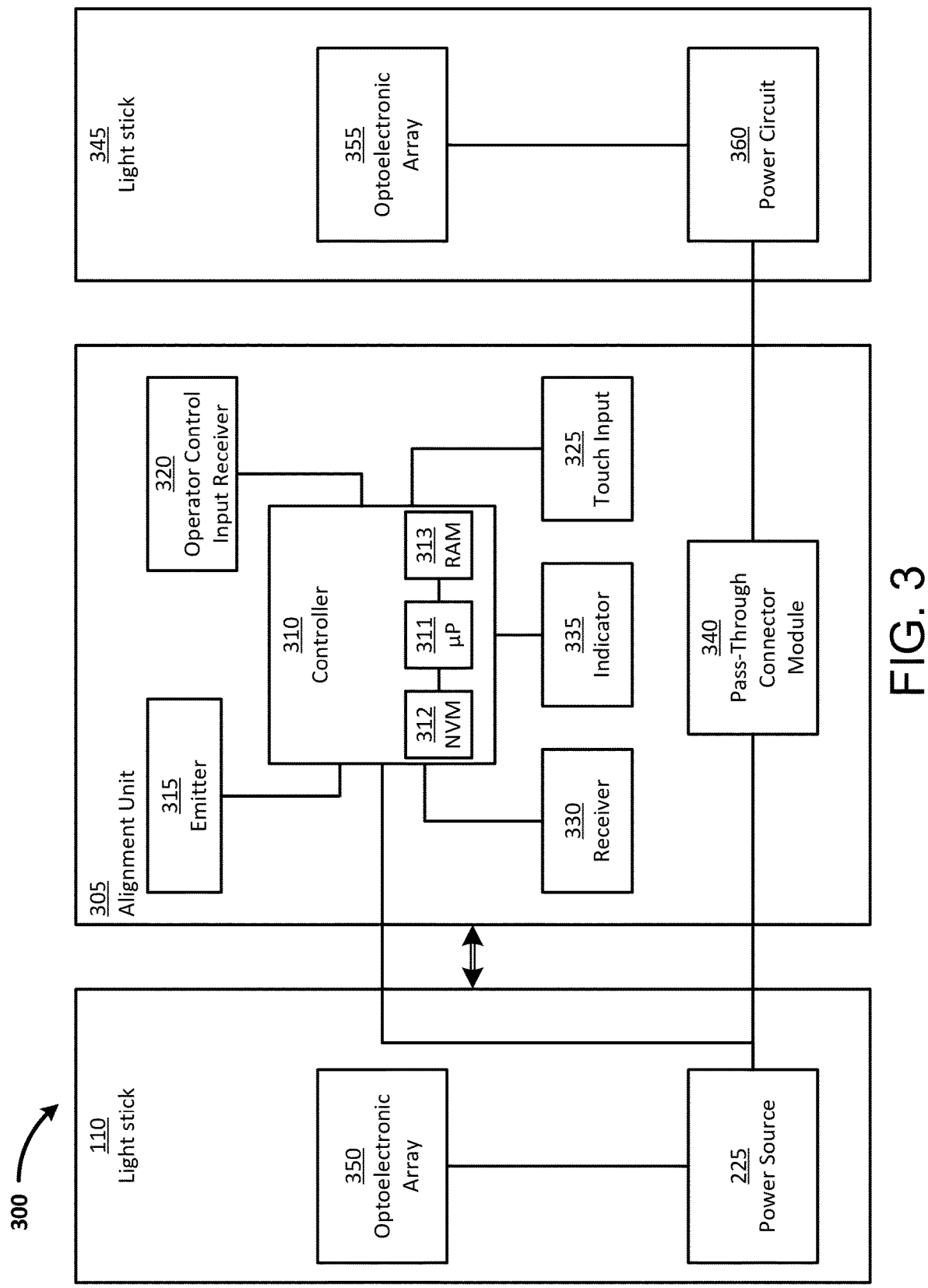
FIG. 3 depicts an exemplary block diagram of an exemplary PAM provided with a pass-through module connection module and a touch input module.

FIG. 3 depicts an exemplary block diagram of an exemplary PAM provided with a pass-through module connection module and a touch input module. An exemplary pluggable alignment system 300 includes an alignment unit 305 coupled to two optoelectronics units.

The alignment unit 305 includes a controller 310. The controller 310 may, for example, include a control circuit. The controller 310 includes a microprocessor 311 (labeled "μP") operably coupled to a non-volatile memory module 312 (labeled "NVM") and a random-access memory module 313 (labeled "RAM"). The non-volatile memory module 312 may, for example, store at least one program of instructions. The microprocessor 311 may, for example, be configured to execute the at least one program of instructions to perform operations for alignment of optoelectronic arrays.

The controller 310 is operably electrically coupled to an emitter 315 and an operator control input receiver 320. The controller 310 may be configured to selectively activate and/or deactivate the emitter 315 in response to input from the operator control input receiver 320. For example, an operator may manipulate the operator control input receiver 320, thereby causing the operator control input receiver 320 to generate at least one signal configured to cause the controller 310 to operate the emitter 315.

The controller 310 is operably electrically coupled to a touch input 325. The touch input 325 may, for example, be configured to operate the operator control input receiver 320. In some embodiments the operator control input receiver 320 may, by way of example and not limitation, be integral to the touch input 325 such that operation of the touch input 325 may operate the operator control input receiver 320. In some embodiments, by way of example and not limitation, the touch input 325 may be configured as the operator control input receiver 320. In some implementations, by way of example and not limitation, a touch input may correspond to touch (e.g., contact) of a portion of a user's body with the touch input 325. For example, a transducer (e.g., the touch input 325) may not translate (e.g., at all, noticeably) in response to the touch input. Such embodiments may, for example, advantageously reduce a number of moving parts and/or may provide a user easy access (e.g., to a large portion or entire portion of a dome) to provide input without having to specifically manipulate a moving part.

In some implementations, the transducer may, for example, be configured as a 'button,' toggle, slider, knob, and/or rocker that may move, flex, rotate and/or displace in response to a user input (e.g., pressing a button, manipulating the transducer).

The controller 310 is operably electrically coupled to a receiver 330. The receiver 330 may, for example, include one or more circuits configured to transduce incoming electromagnetic signals. For example, the receiver 330 may be configured as an optical sensor. The optical sensor may, for example, be configured to generate at least one signal received by the controller 310 in response to an incoming optical signal (e.g., laser beam).

The controller 310 is operably electrically coupled to an indicator module 335. The indicator module 335 may, for example, generate one or more visual indicia in response to one or more electrical signals from the controller 310. The controller 310 may, by way of example and not limitation, generate such electrical signals to cause the indicator module 335 to generate one or more visual indicia in response to one or more signals from the receiver 330 generated in response to an incoming electromagnetic signal. Accordingly, various embodiments may advantageously actively generate one or more visual indicia such as, for example, to guide a user in alignment of the first unit 110 and/or an opposing unit (e.g., the second unit 115). For example, the (active) visual indicia may indicate to a user a direction necessary to operate a unit for alignment. The visual indicia may indicate, for example, location of an impinging optical being. The visual indicia may indicate, for example, a level of alignment reached (e.g., misaligned, roughly aligned, nearly aligned, fully aligned, ready to activate an automatic alignment system).

The alignment unit 305 is mechanically coupled to the first unit 110 (labeled as "light stick"), as depicted by a double line. The alignment unit 305 is electrically coupled to the first unit 110 such that the controller 310 is electrically coupled to the power source 225 of the first unit 110. The alignment unit 305 is further provided with a pass-through connector module 340. The power source 225 is operably electrically coupled to the pass-through connector module 340.

A connected optoelectronic unit 345 (labeled as "light stick") is coupled to the first unit 110 via the alignment unit 305. As depicted, the connected optoelectronic unit 345 includes a power circuit 360. The power circuit 360 is electrically coupled to the pass-through connector module 340. Accordingly, the power circuit 360 is operably electrically coupled to the power source 225 via the pass-through connector module 340. The connected optoelectronic unit 345 may, for example, be 'daisy-chained' to the first unit 110 via the alignment unit 305. Accordingly, the connected optoelectronic unit 345 may, for example, advantageously be provided power via the first unit 110 with a shorter cable (e.g., only from the alignment unit 305 to the connected optoelectronic unit 345 instead of directly from a central power supply). Various such embodiments may, for example, advantageously simplify wiring. Such embodiments may reduce cabling costs. Various such embodiments may reduce tripping hazards.

The first unit 110 is provided with an optoelectronic array 350. The optoelectronic array 350 is electrically coupled to the power source 225. The connected optoelectronic unit 345 is provided with an optoelectronic array 355. The optoelectronic array 355 is electrically coupled to the power circuit 360. Accordingly, the optoelectronic array 355 is operably electrically coupled to the power source 225 via the pass-through connector module 340. In some embodiments, the optoelectronic array 355 and the optoelectronic array 350 may, for example, be coupled (e.g., via data signal conduits) via the pass-through connector module 340. In various embodiments, for example, the pass-through connector module 340 may include one or more ports. The pass-through connector module 340 may, for example, include one or more individual wires. In some embodiments the pass-through connector module 340 may include multiple groups of wires (e.g., cables with bundled electrical wires, such as for data and/or power).

Figure 4:
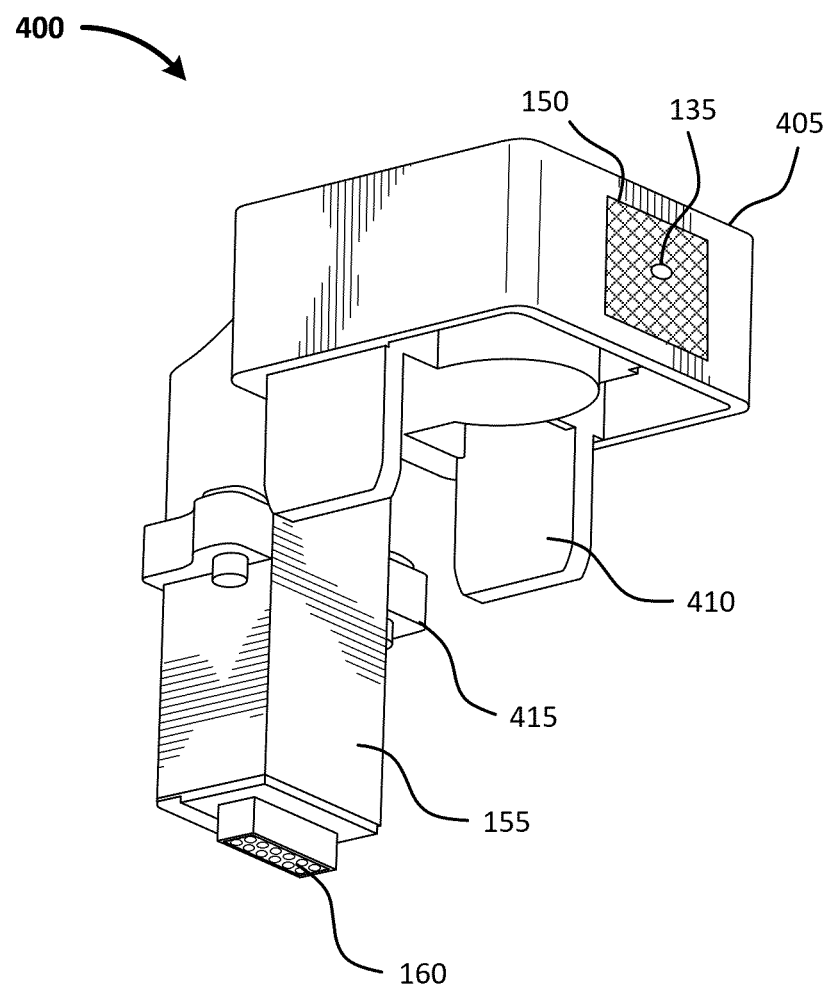
FIG. 4 depicts an exemplary PAM having a reflective module and an optical emitter.

FIG. 4 depicts an exemplary PAM having a reflective module and an optical emitter. An exemplary pluggable alignment module 400 includes a housing 405. The housing 405 is provided with an emitter 135 and an indicator module 150. The housing 405 is further provided with alignment members 410. The alignment members 410, as depicted, extend downward from the housing 405 substantially parallel to a longitudinal axis of an optoelectronic unit (e.g., the first unit 110 as disclosed at least with reference to FIG. 1). The exemplary pluggable alignment module 400 is provided with the coupling module 155, as disclosed at least with reference to the first pluggable alignment module 125 of FIG. 1. The coupling module 155 is provided with two alignment members 415.

The alignment members 410, the coupling module 155, and/or the two alignment members 415 may, for example, be configured to be (releasably) received into corresponding mating cavities in an optoelectronic unit such that the exemplary pluggable alignment module 400 is (releasably) secured in a (predetermined) orientation. The exemplary pluggable alignment module 400 may, for example, be oriented, when releasably and pluggably coupled to an optoelectronic unit, such that an electromagnetic signal launched from the emitter 135 (e.g., a laser beam such as optical beam 140) is (a) orthogonal to a longitudinal axis of the optoelectronic unit, and/or is (b) parallel to an optical axis of an optoelectronic array (e.g., emitters and/or receivers) of the optoelectronic unit. Accordingly, the exemplary pluggable alignment module 400 may be advantageously pluggably and releasably coupled into a desired orientation for alignment.

The coupling module 155 is further provided with the plug module 160 (e.g., as disclosed at least with reference to first pluggable alignment module 125 of FIG. 1). The plug module 160 may, for example, operably electrically couple the emitter 135 to an electrical source when releasably and pluggably coupled to an optoelectronic unit.

Figure 5:
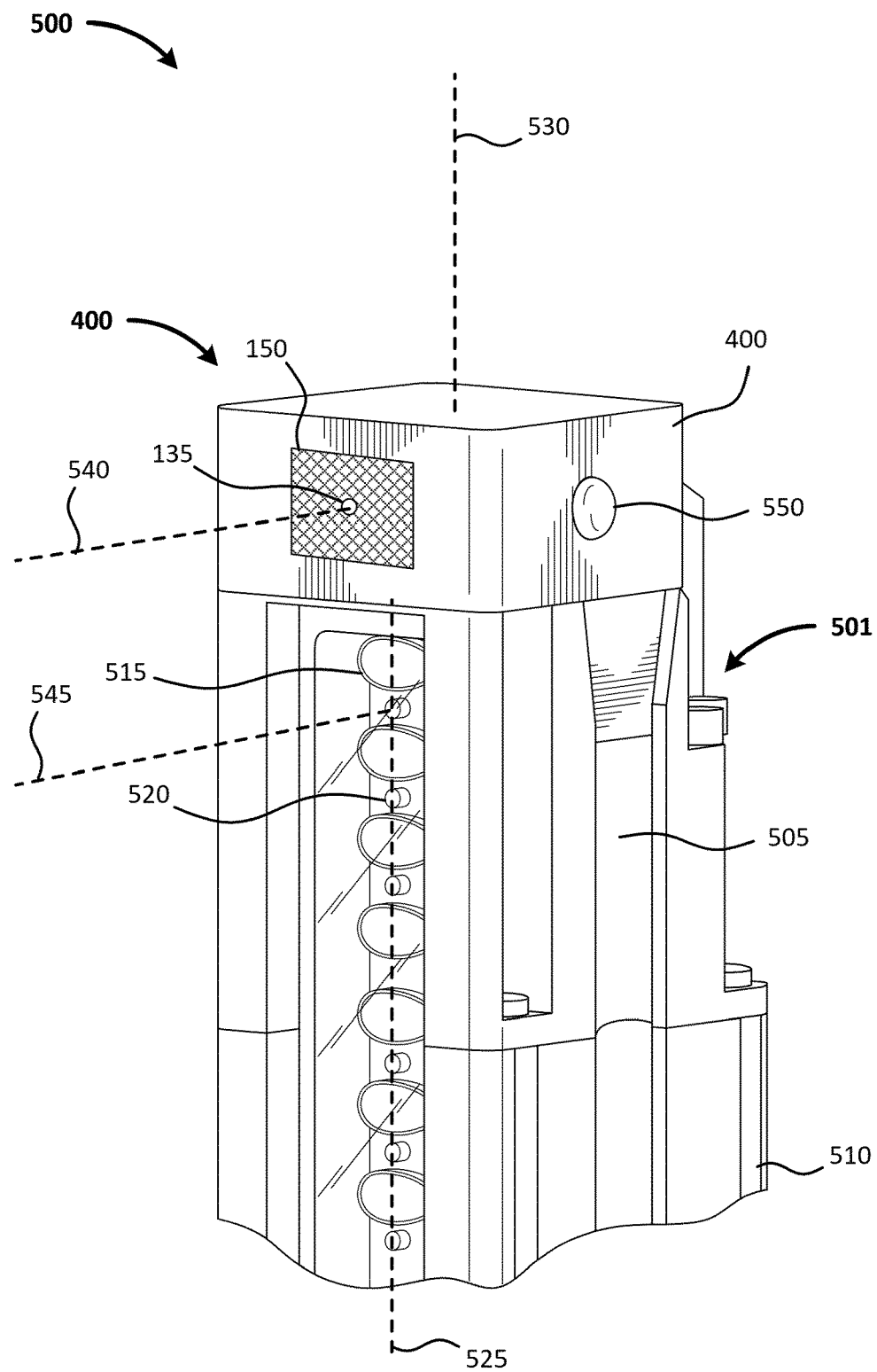
FIG. 5 depicts the exemplary PAM releasably, pluggably coupled to an exemplary light stick.
Figure 6:
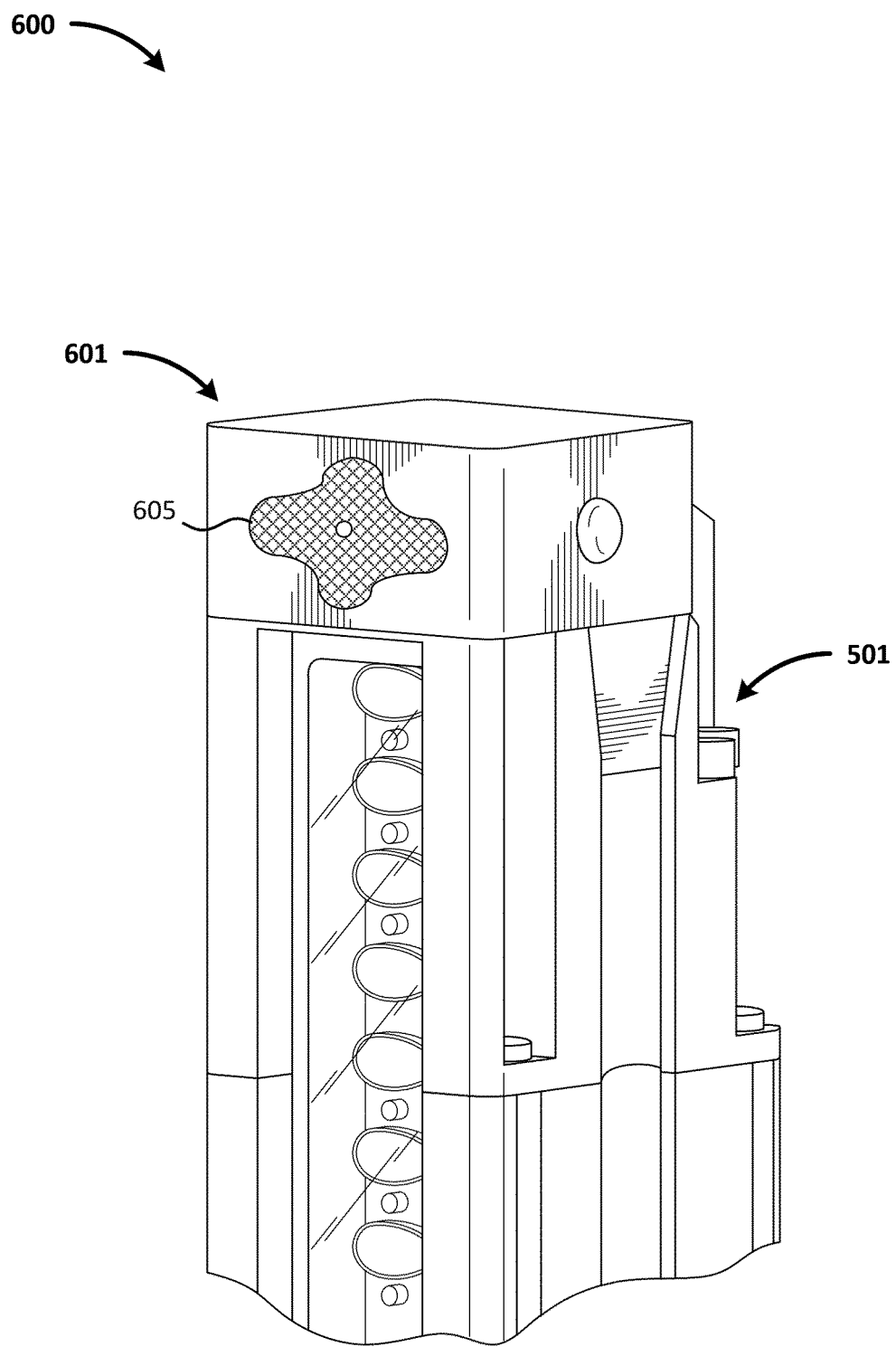
FIG. 6 depicts an exemplary PAM having an exemplary lobular shaped reflective module.

FIG. 5 depicts the exemplary PAM releasably, pluggably coupled to an exemplary light stick. An exemplary pluggable alignment system 500 includes the exemplary pluggable alignment module 400 pluggably and releasably coupled to a light stick 501. The light stick 501 includes an upper module 505 and a lower module 510. The light stick 501 may, by way of example and not limitation, be configured such as disclosed at least with reference to FIGS. 2A-3 of U.S. application Ser. No. 15/494,415, titled "Field Installable Light Curtain Status Module," filed by Matthew Michael Gelineau, et al., on Apr. 21, 2017, and issued as U.S. Pat. No. 9,870,681 on Jan. 16, 2018; and U.S. application Ser. No. 14/819,264, titled "Field Installable Light Curtain Status Module," filed by Matthew Michael Gelineau, et al., on Aug. 5, 2015, and issued as U.S. Pat. No. 9,671,523 on Jun. 6, 2017, the entire contents of which applications are incorporated herein by reference.

In the depicted example, the light stick 501 is provided with a first optoelectronic array 515 including a (linear) array of receiver elements (e.g., optical sensors). The light stick 501 is further provided with a second optoelectronic array 520 including a (linear) array of emitter elements (e.g., laser emitters). As depicted, the first optoelectronic array 515 and the second optoelectronic array 520 are oriented along a longitudinal axis 525. The longitudinal axis 525 is (substantially) parallel to a longitudinal axis 530 of the light stick 501. Each emitter of the second optoelectronic array 520 is configured to emit along an optical axis parallel to an optical axis 545. The optical axis 545 may be substantially orthogonal to the longitudinal axis 525. The receivers of the first optoelectronic array 515 may, for example, be configured to receive along a corresponding optical axis parallel to the optical axis 545. Accordingly, an optical plane may, for example, be defined by a plane containing the longitudinal axis 525 and the optical axis 545. The orientation may, for example, be induced and/or maintained by the coupling module 155, the alignment members 410, the two alignment members 415, the plug module 160, or some combination thereof.

The exemplary pluggable alignment module 400 is pluggably assembled onto an end of the light stick 501 along the longitudinal axis 530. The emitter 135 is thereby oriented to emit along an axis optical 540. The optical axis 540 is (substantially) parallel to the optical axis 545. The optical axis 540 may, for example, be in the optical plane. The indicator module 150 may, for example, be configured to generate at least one visual indicium in response to an impinging optical signal within a (predetermined) range (e.g., left/right) from the optical plane and/or within a (predetermined) range (e.g., up/down) from the optical axis 540. The range may, for example, correspond to a predetermined 'near-alignment' range.

The exemplary pluggable alignment module 400 is further provided with a button 550. The button 550 may, for example, be at least part of an operator control input receiver (e.g., operator control input receiver 220, operator control input receiver 320). The button 550 may be configured to selectively activate the emitter 135. For example, operation of the button 550 may toggle the emitter 135 on/off.

In various embodiments, axial coupling of the exemplary pluggable alignment module 400 to an end of the light stick 501 may advantageously prevent obstruction of one or more elements of the first optoelectronic array 515 and/or the second optoelectronic array 520. For example, the light stick 501 may be a 'full-length' light stick configured to generate a light curtain (e.g., curtain of light 120) along substantially the entire length of the light stick 501. Accordingly, axial coupling of the exemplary pluggable alignment module 400 to the end of the light stick 501 may advantageously permit alignment of the light stick 501 without occlusion of any portion of the first optoelectronic array 515 and/or the second optoelectronic array 520.

The exemplary pluggable alignment module 400 is pluggably assembled onto an end of the light stick 501 along the longitudinal axis 530. The emitter 135 is thereby oriented to emit along an optical axis 540. The optical axis 540 is (substantially) parallel to the optical axis 545. The optical axis 540 may, for example, be in the optical plane. The indicator module 150 may, for example, be configured to generate at least one visual indicium in response to an impinging optical signal within a (predetermined) range (e.g., left/right) from the optical plane and/or within a (predetermined) range (e.g., up/down) from the optical axis 540. The range may, for example, correspond to a predetermined 'near-alignment' range.

Figure 7:
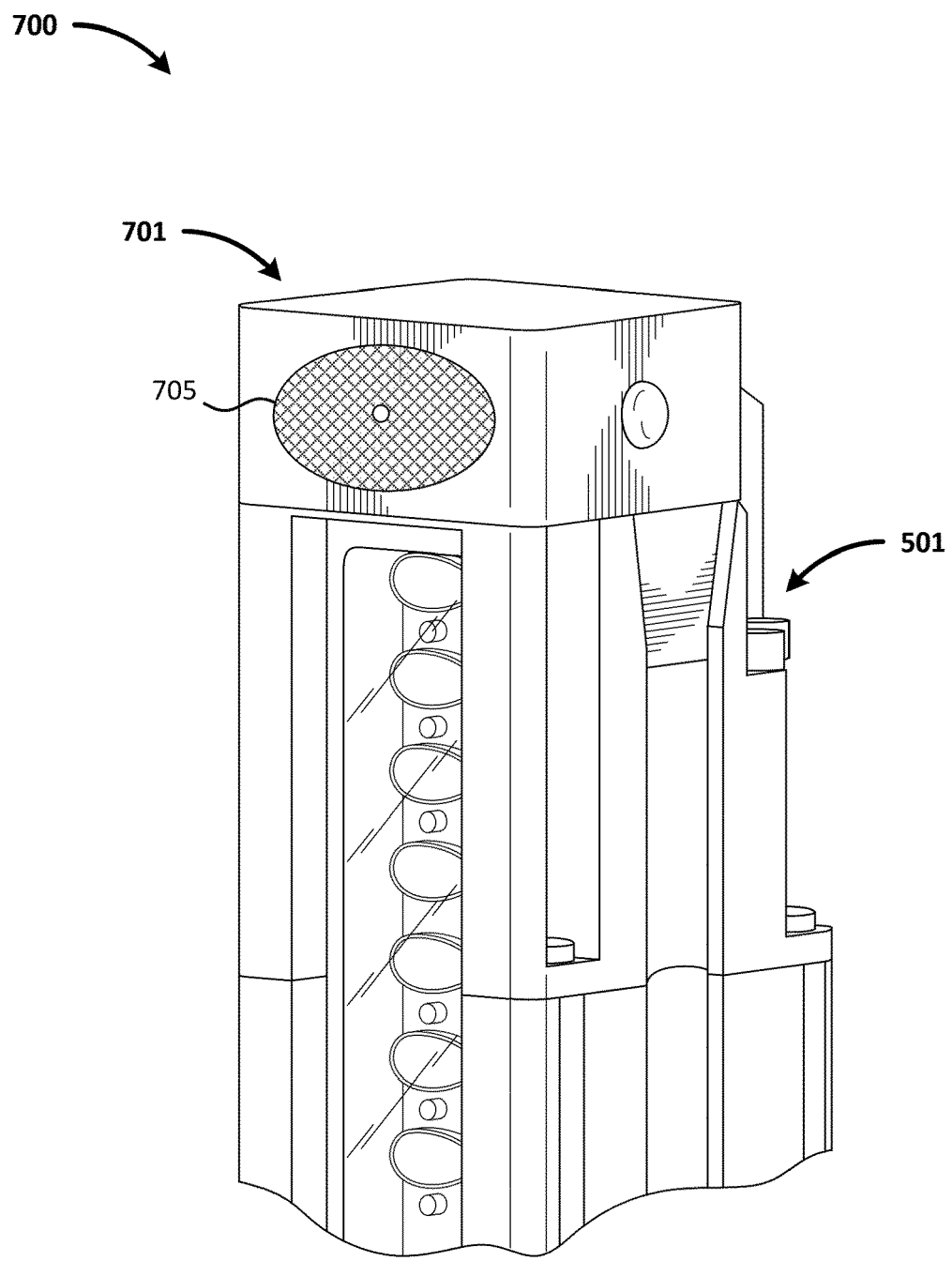
FIG. 7 depicts an exemplary PAM having an exemplary oval-shaped reflective module.

FIG. 7 depicts an exemplary PAM having an exemplary oval-shaped reflective module. An exemplary pluggable alignment system 700 is depicted. In the depicted example, a pluggable alignment module 701 is axially releasably and pluggably coupled to the light stick 501. The pluggable alignment module 701 is provided with an oval reflective module 705. The oval reflective module 705 may, for example, advantageously limit generation of visual indicia to a substantially continuously variable or a constant distance from an alignment target (e.g., a center of the oval reflective module 705).

Figure 8:
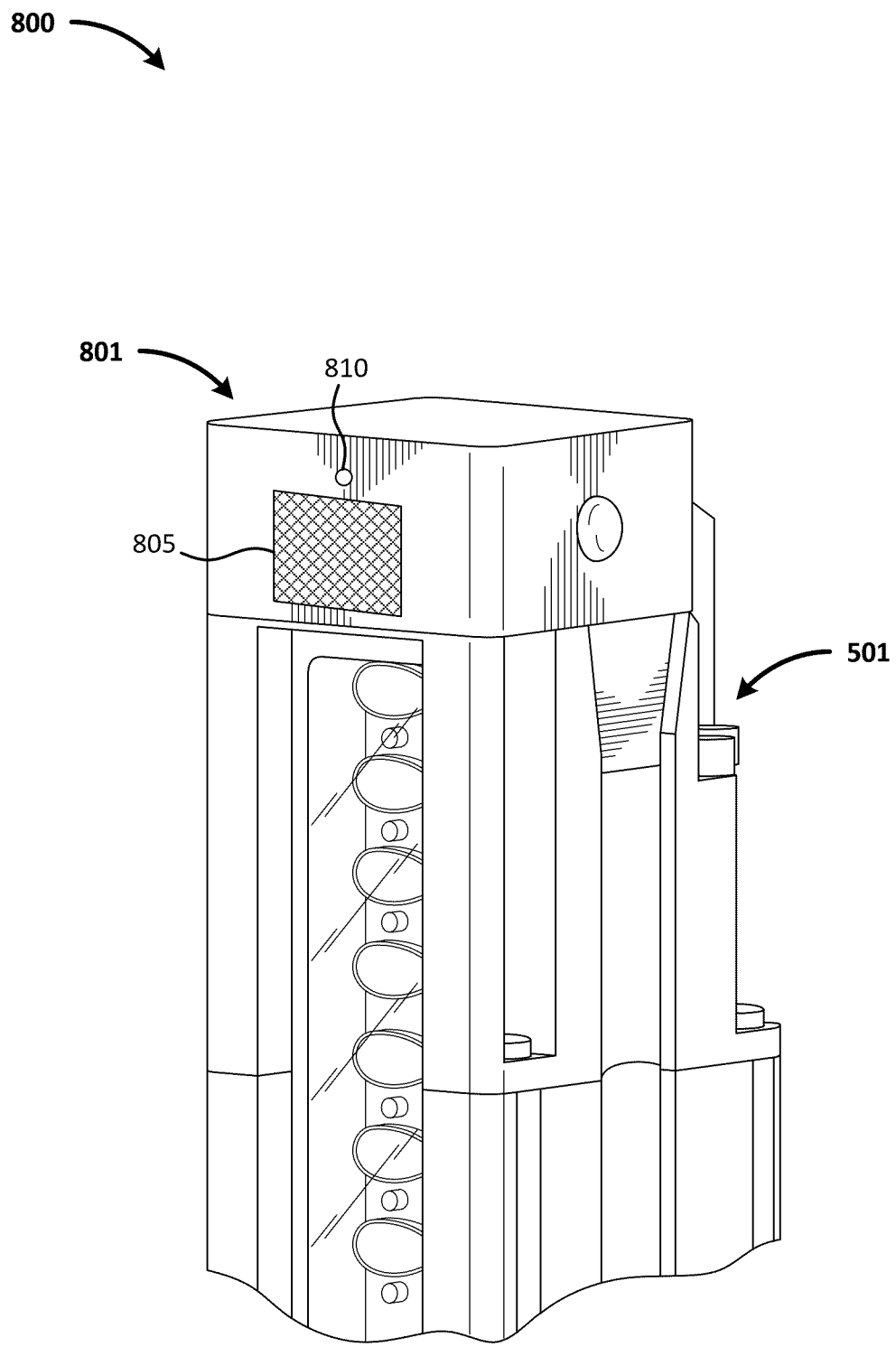
FIG. 8 depicts an exemplary PAM having an exemplary spatially separated reflective module and emitter module.

FIG. 8 depicts an exemplary PAM having an exemplary spatially separated reflective module and emitter module. An exemplary pluggable alignment system 800 is depicted. In the depicted example, a pluggable alignment module 801 is axially releasably and pluggably coupled to the light stick 501. The pluggable alignment module 801 is provided with a rectangular reflective module 805. The pluggable alignment module 801 further includes an emitter 810 positioned above the rectangular reflective module 805. In various embodiments an opposing PAM may, by way of example and not limitation, include an indicator module positioned above an emitter. Accordingly, the corresponding pair of PAMs may advantageously indicate alignment without risk of a user 'losing' the alignment beam on the rectangular reflective module 805 when it is in perfect alignment (e.g., by the alignment beam shining into the (non-reflective) aperture for the emitter 810). By offsetting the emitter 810 from the target (e.g., the center of the rectangular reflective module 805) the target point and/or region may be advantageously uninterrupted and clearly visible. In some embodiments, a target visual indicium may be provided on the rectangular reflective module 805. The target visual indicia may, by way of example and not limitation, include a dot. The target visual indica may include a crosshair. The target visual indicia may include a bullseye.

Figure 9:
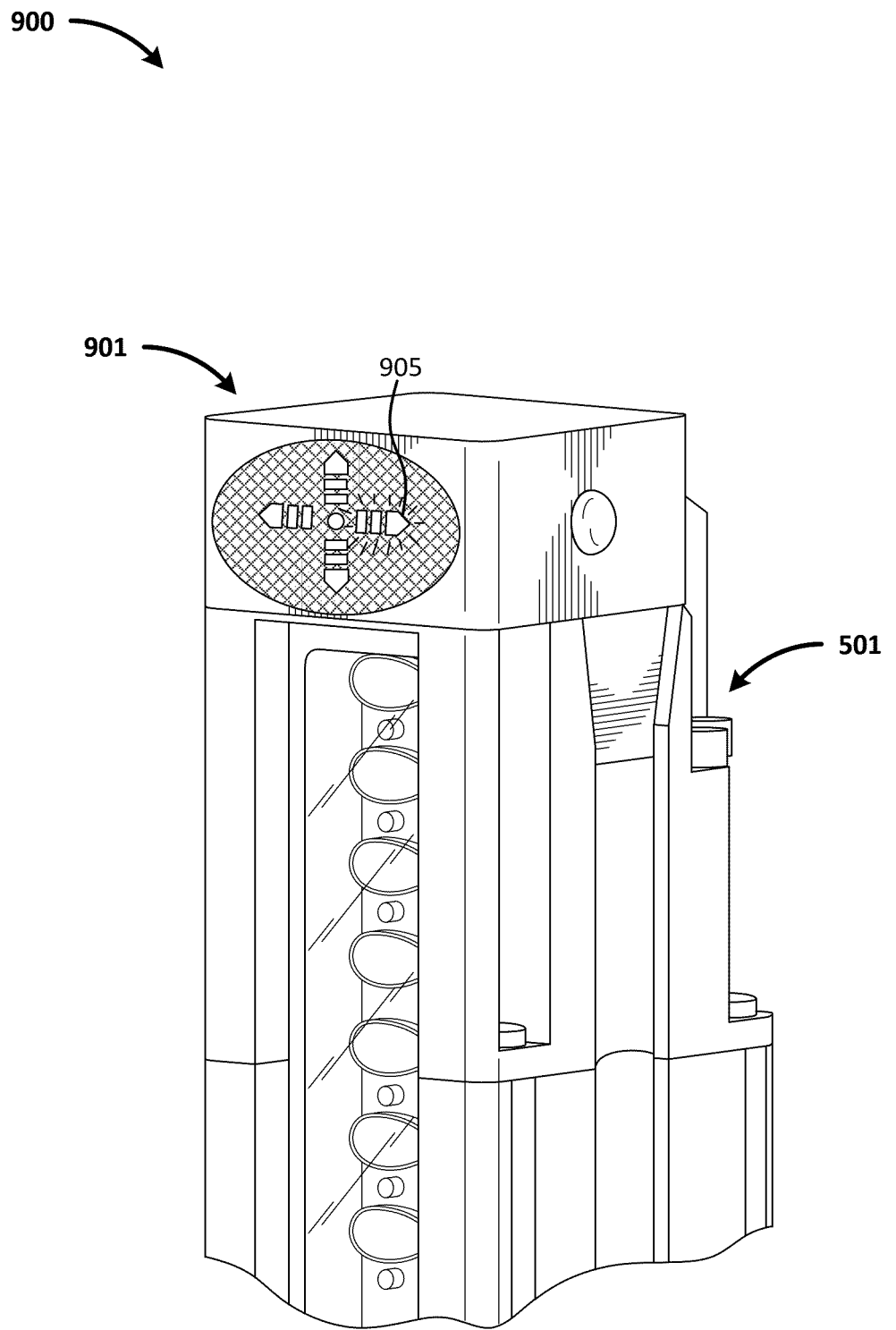
FIG. 9 depicts an exemplary PAM having an exemplary active indicia generation module.

FIG. 9 depicts an exemplary PAM having an exemplary active indicia generation module. An exemplary pluggable alignment system 900 is depicted. In the depicted example, a pluggable alignment module 901 is axially releasably and pluggably coupled to the light stick 501. The pluggable alignment module 901 is provided with an oval reflective module such as disclosed at least with reference to the oval reflective module 705 of FIG. 7. The pluggable alignment module 901 is further provided with an active indicator module 905. The active indicator module 905 may, for example, be configured as disclosed at least with reference to the indicator module 335 of FIG. 3. The active indicator module 905 may, for example, be operated (e.g., by a controller such as the controller 310 as disclosed at least with reference to FIG. 3) to emit (optical) visual indicia in response to a location of an impinging alignment beam (e.g., a laser beam from an opposing PAM). As depicted, the active indicator module 905 is configured in a "plus" configuration with up, down, left, and right arrows. One or more blocks in a grouping may be activated such as, for example, corresponding to a distance the opposing PAM must be rotated and/or moved to bring the unit into alignment. Accordingly, active (visual) feedback may be advantageously generated for a user. In some embodiments, audible (e.g., one or more tones corresponding to (levels of) alignment and/or misalignment) and/or tactile feedback (e.g., haptic such as vibration) may be advantageously generated in response to alignment and/or misalignment. In some embodiments, for example, tactile feedback modes of operation may be used to communicate alignment and/or misalignment.

Figure 10:
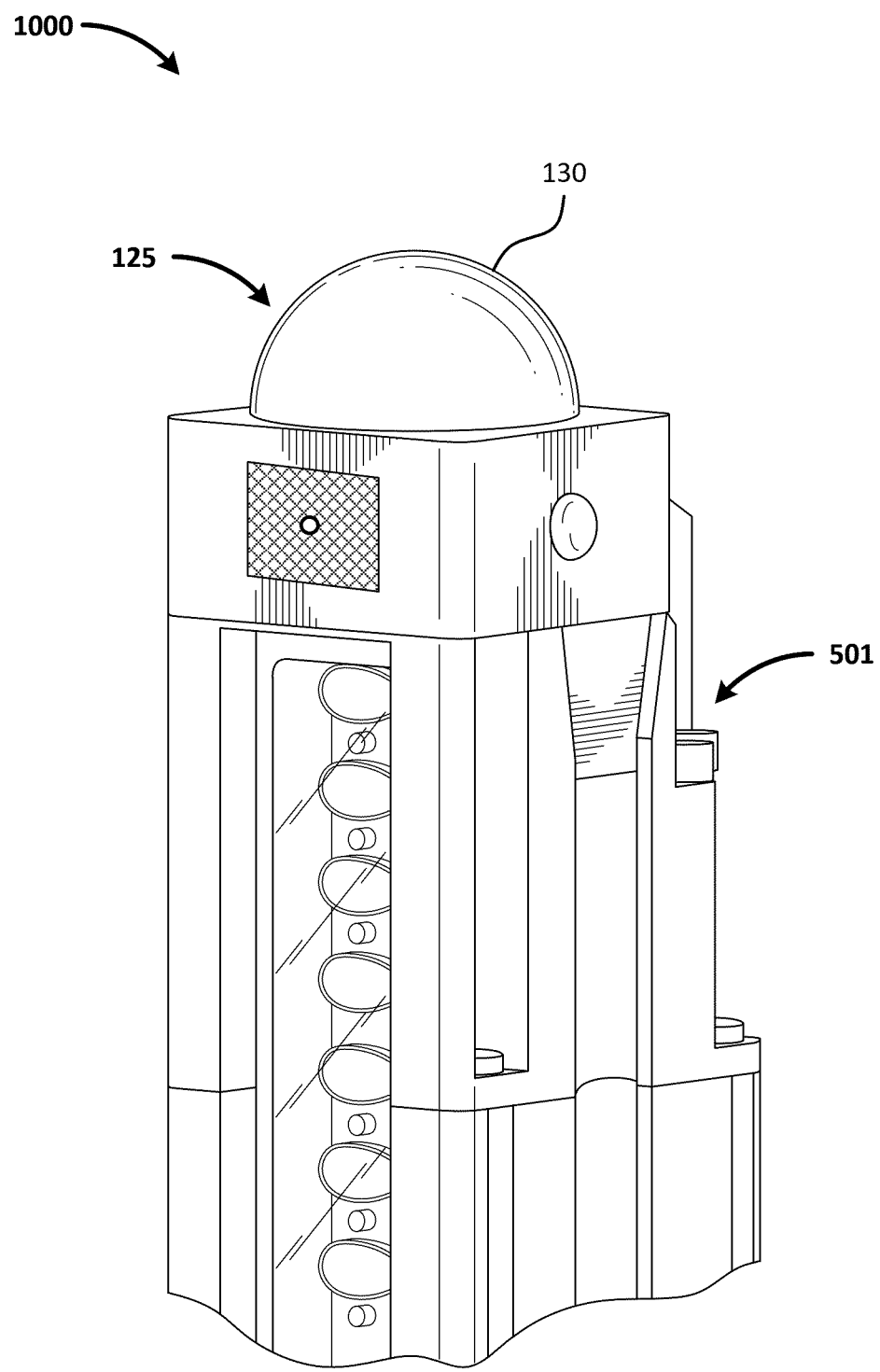
FIG. 10 depicts an exemplary PAM of FIG. 1 having an exemplary touch input module.

FIG. 10 depicts an exemplary PAM of FIG. 1 having an exemplary touch input module. An exemplary pluggable alignment system 1000 is depicted. In the depicted example, the first pluggable alignment module 125 is axially releasably and pluggably coupled to the light stick 501. The first pluggable alignment module 125 is provided with the touch input and indication module 130. The touch input and indication module 130 may, for example, be configured to operate the emitter 135 in response to touch input for a user. A user may, by way of example and not limitation, 'tap' the touch input and indication module 130 to turn the emitter 135 on and/or 'tap' the touch input and indication module 130 to turn the emitter 135 off. Accordingly, a user may easily operate the emitter 135 without having to locate a button. As depicted, the button (e.g., such as the button 550) is also provided. The button may, for example, disable the touch input and indication module 130 such that accidental activation of the emitter 135 may be advantageously prevented.

The touch input and indication module 130 may, for example, be configured as an indicator module. The touch input and indication module 130 may, for example, generate at least one visual indicium (e.g., emit a (predetermined color) light) when the emitter 135 is in a corresponding state (e.g., on). In some embodiments the touch input and indication module 130 may, for example, be configured to indicate modes of operation by way of different states of illumination such as on, off, steady, flashing, color sequencing, or some combination thereof. In some embodiments the touch input and indication module 130 may, for example, be configured to indicate a current state of the light stick 501 (e.g., operational, activated, aligned, alarm state, warning state, safe state). The first pluggable alignment module 125 may, for example, be configured to remain on the light stick 501 after near-alignment is achieved.

In some embodiments the touch input and indication module 130 may not be configured to receive touch input. In some embodiments the touch input and indication module 130 may not be configured to provide indication.

Figure 11:
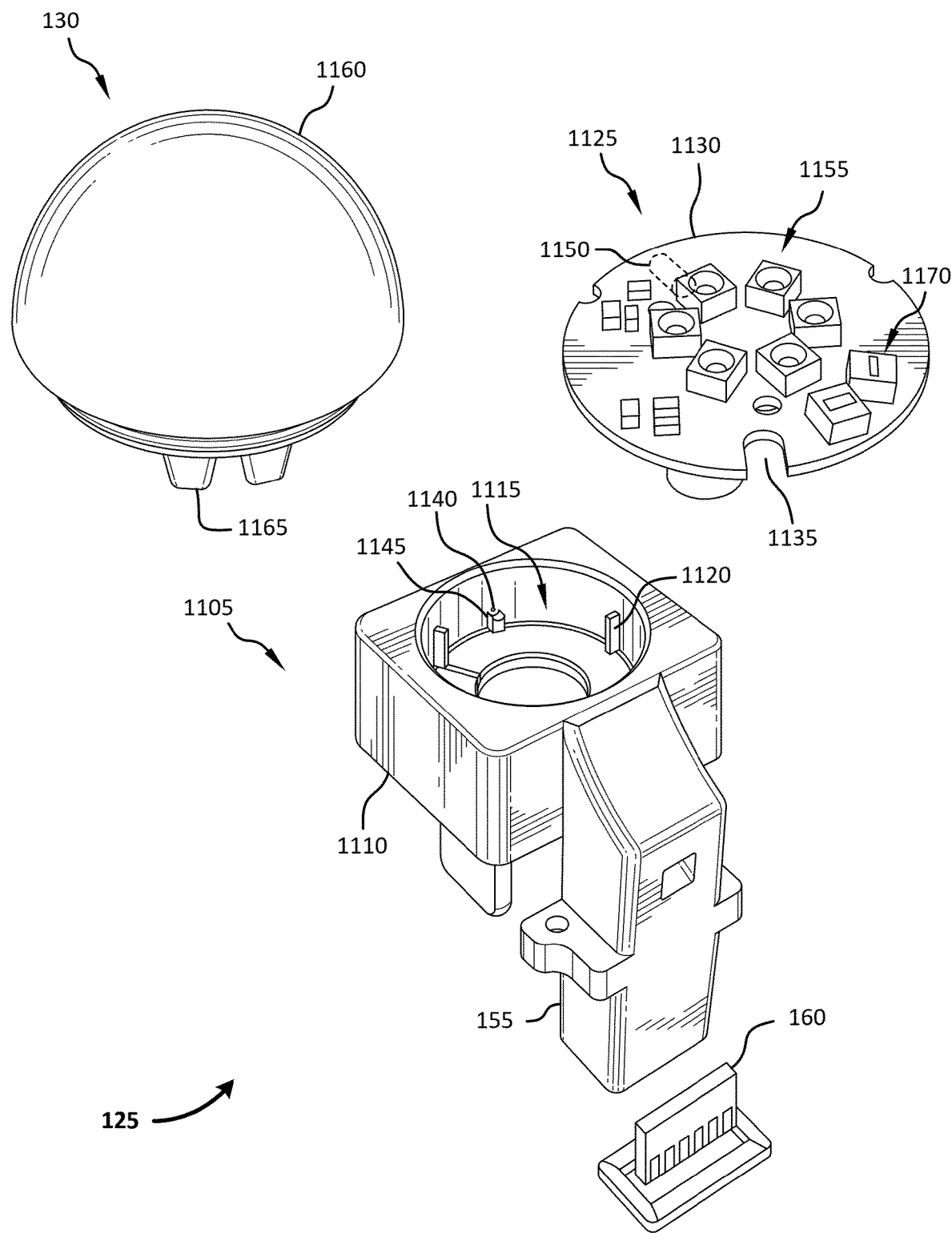
FIG. 11 depicts an exploded view of the exemplary PAM of FIG. 10.

FIG. 11 depicts an exploded view of the exemplary PAM of FIG. 10. The first pluggable alignment module 125 is depicted in the exploded view. A base module 1105 is provided. As depicted, the base module 1105 is integrally formed with the coupling module 155. The base module 1105 includes a housing 1110. The housing 1110 is provided with a cavity 1115. A wall of the cavity 1115 includes alignment features 1120. The alignment features 1120 may, for example, be unitarily formed with the cavity 1115 and/or the housing 1110. For example, the alignment features 1120 may be integrally formed (e.g., of a continuous material, for example, by injection molding) with the cavity 1115 and/or the housing 1110.

A circuit module 1125 is configured to be disposed in the cavity 1115. The circuit module 1125 includes a circuit board 1130 (e.g., printed circuit board (PCB)). The circuit board 1130 is provided with alignment features 1135. As depicted, the alignment features 1135 are cutouts in the circuit board 1130. The alignment features 1135 may be configured to matingly engage with the alignment features 1120 when the circuit module 1125 is disposed in the cavity 1115. Accordingly, the circuit board 1130 may be advantageously quickly, easily, and/or repeatably disposed in a preferred orientation.

The cavity 1115 is further provided with an emitter aperture 1140. The emitter aperture 1140 may be configured to align with an emitter (e.g., a laser module) to allow an optical beam originating from within the cavity 1115 to pass through the housing 1110 and thereby be launched from the first pluggable alignment module 125. An emitter alignment feature 1145 is disposed, in the depicted example, directly beneath the emitter aperture 1140. The emitter alignment feature 1145 may, for example, be centered on a longitudinal axis passing through the center of emitter aperture 1140, the longitudinal axis being parallel to a longitudinal axis of the first pluggable alignment module 125 (e.g., such as the longitudinal axis 530).

As depicted, the emitter alignment feature 1145 is provided with a concave upper surface. The emitter alignment feature 1145 may be configured to matingly receive an emitter 1150. The emitter 1150 is coupled to an underside of the circuit module 1125. For example, the emitter 1150 may be electrically coupled (e.g., soldered) to the circuit board 1130. The emitter alignment feature 1145 may be configured to receive and support the emitter 1150 in a desired orientation.

For example, the emitter alignment feature 1145 may support the emitter 1150 such that an optical axis of a beam omitted from the emitter 1150 is centered with respect to the emitter aperture 1140. The emitter alignment feature 1145 may support the emitter 1150 in an orientation substantially parallel to an optical axis of the light stick 501 (e.g., optical axis 545). For example, the emitter 1150 may be oriented and supported by the emitter alignment feature 1145 such that an emitted optical beam is launched along the optical axis 540. The emitter alignment feature 1145 may support the emitter 1150 substantially orthogonal to at least one longitudinal axis (e.g., longitudinal axis 525, longitudinal axis 530) of the light stick 501. The emitter alignment feature 1145 may, for example, support the emitter 1150 such that an optical beam launched from the emitter 1150 is in an optical plane of the light stick 501 (e.g., defined by the longitudinal axis 525 and the optical axis 545). Accordingly, the emitter 1150 may be advantageously supported and/or restrained in a desired configuration (e.g., including orientation) when the circuit module 1125 is disposed within the cavity 1115. Various such embodiments may, for example, permit the housing 1110 to be cost-effectively manufactured and/or assembled. For example, precise indexing features may be injection molding and/or machined (e.g., in post-injection molding operation(s)) without adding (significant) additional expense to the light stick 501.

The circuit module 1125 is further provided with an indicator array 1155. The indicator array 1155 is depicted as a two-dimensional array disposed on the circuit board 1130. Each element of the indicator array 1155 may, for example, be electrically coupled to the circuit board 1130. Each element of the indicator array 1155 may, for example, be a light emitting element (e.g., LED). The indicator array 1155 may, for example, be operated by a controller (e.g., controller 310) to generate one or more (active) visual indicium, such as via the touch input and indication module 130. For example, the indicator array 1155 may be operated to indicate a current state of the emitter 1150 (e.g., on, off, strobing).

The touch input and indication module 130 includes a housing 1160 and connector elements 1165. The connector elements 1165 may, for example, be mechanical connectors. The connector elements 1165 may, for example, be electrical connectors (e.g., to at least one light emitting element in the housing 1160, to a touch sensing circuit(s) in the housing 1160). The connector elements 1165 may be configured to be matingly received by corresponding connector elements 1170 disposed on the circuit board 1130 of the circuit module 1125. The connector elements 1170 may, for example, mechanically couple to the connector elements 1165. The connector elements 1170 may, for example, electrically couple the connector elements 1165 to the circuit board 1130.

The housing 1110 is coupled to the coupling module 155. As depicted, the coupling module 155 is unitarily formed with the housing 1110. The coupling module 155 may, for example, be integrally formed (e.g., formed with continuous material, for example, by injection molding) with the housing 1110. The plug module 160 is coupled to the coupling module 155. Electrical conduits in the coupling module 155 may be configured to make electrical connection between the plug module 160 and the circuit module 1125. Accordingly, the circuit module 1125 may be in pluggable electrical communication with the light stick 501 when the first pluggable alignment module 125 is pluggably coupled to the light stick 501.

Figure 12:
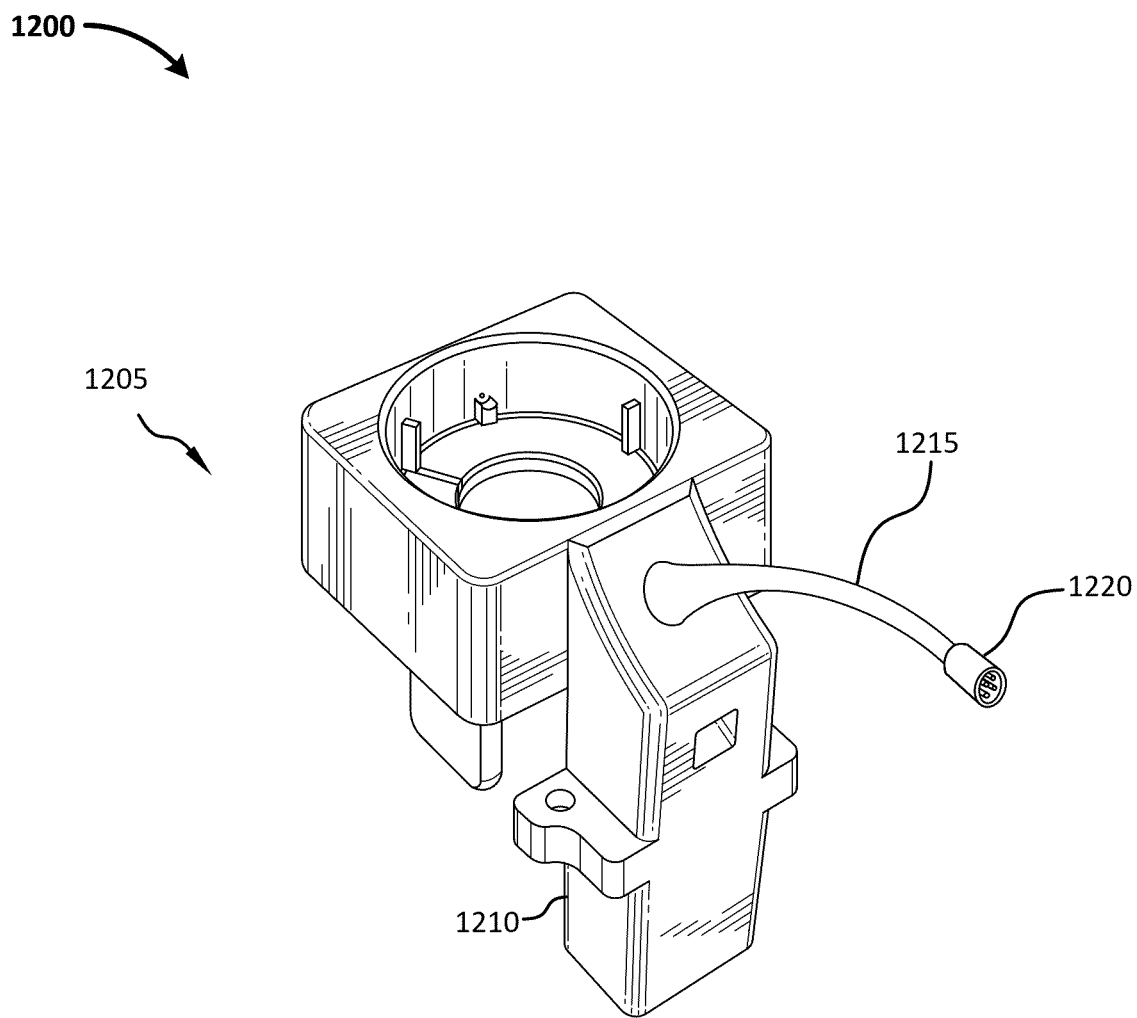
FIG. 12 depicts an exemplary PAM base module having an exemplary pass-through connection module.

FIG. 12 depicts an exemplary PAM base module having an exemplary pass-through connection module. An exemplary pluggable alignment module 1200 is depicted having a base module 1205. The base module 1205 is provided with a coupling module 1210 (e.g., such as coupling module 155 and/or plug module 160). A pass-through connection module is at least partially disposed in the coupling module 1210. In the depicted example, a pass-through conduit 1215 extends from the coupling module 1210. The pass-through conduit 1215 may, for example, be in electrical communication with a plug module (e.g., such as plug module 160) and/or a circuit module (e.g., circuit module 1125) such that when the exemplary pluggable alignment module 1200 is pluggably coupled to an optoelectronic unit (e.g., such as the light stick 501, the first unit 110), the pass-through conduit 1215 is in electrical communication with one or more circuits of the optoelectronic unit (e.g., power source 225, optoelectronic array 350).

The pass-through conduit 1215 is provided with an electrical coupler 1220. In the depicted example, the electrical coupler 1220 is a 4-pin plug. The electrical coupler 1220 may, for example, be releasably and/or pluggably coupled to a second optoelectronic unit (e.g., connected optoelectronic unit 345, such as disclosed at least with reference to FIG. 3). Accordingly, the second optoelectronic unit may be in electrical communication with an optoelectronic unit to which the exemplary pluggable alignment module 1200 is pluggably coupled (e.g., the light stick 501, the first unit 110). For example, a power circuit (e.g., the power circuit 360) and/or an optoelectronic array (e.g., optoelectronic array 355) may be in electrical communication (e.g., to transmit power, data) with the optoelectronic unit to which the exemplary pluggable alignment module 1200 is coupled. Accordingly, various embodiments may advantageously provide pluggable cascading of optoelectronic units.

Figure 13:
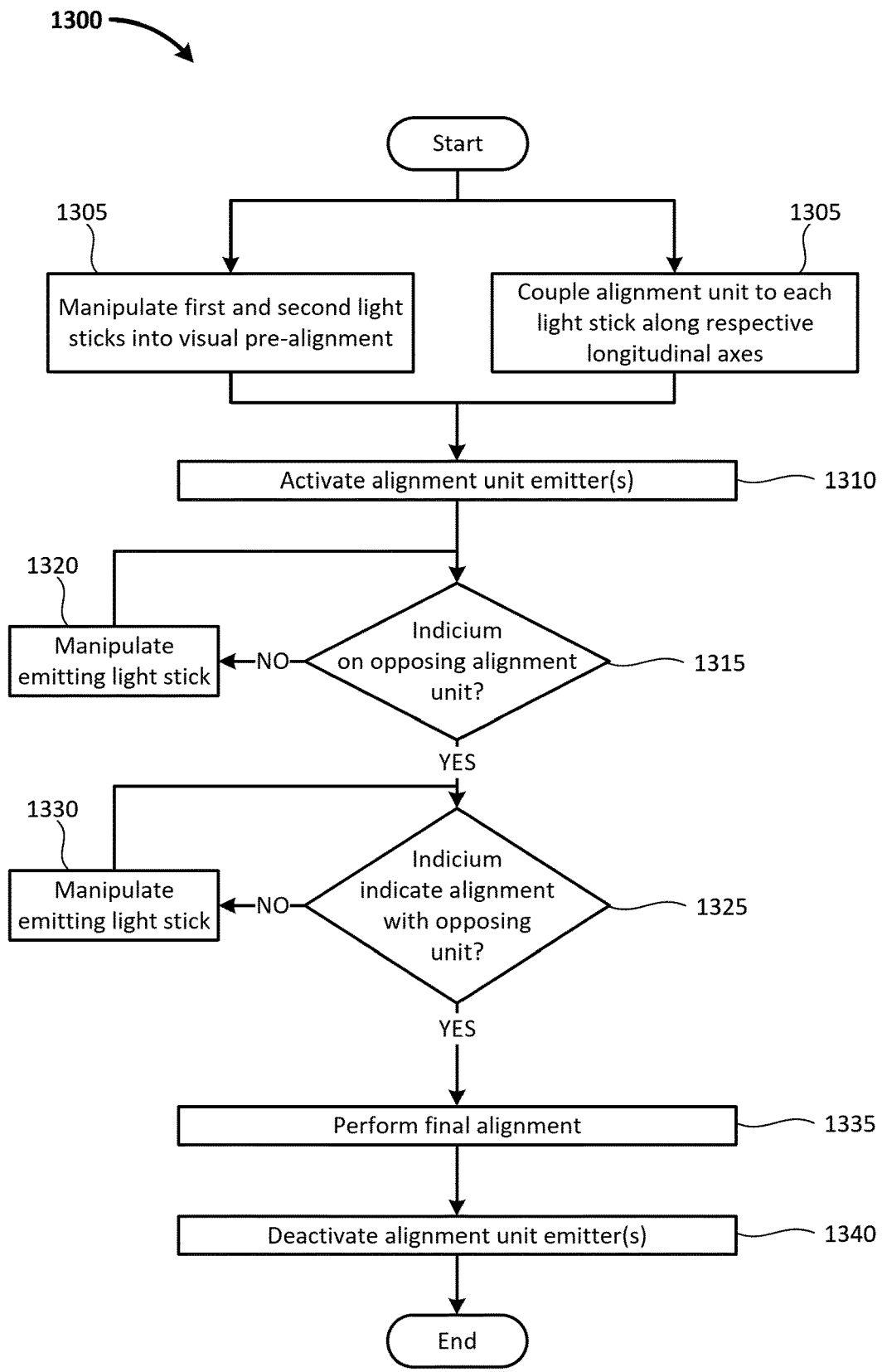
FIG. 13 depicts an exemplary method of alignment using at least one PAM.

FIG. 13 depicts an exemplary method of alignment using at least one PAM. A method 1300 begins by manipulating, in a step 1305, a first light stick and a second light stick into (visual) pre-alignment. The first and second light sticks may, for example, include an emitting optoelectronic element(s) and a receiving optoelectronic element(s), respectively. The emitting optoelectronic element(s) may, for example, be spatially distributed in an array. The receiving optoelectronic elements may, for example, be spatially distributed in an array. A receiving optoelectronic element may, by way of example and not limitation, be configured as an active receiver element (e.g., generate an electronic signal in response to detection of incoming light). A receiving optoelectronic element may, for example, be configured as a reflective element (e.g., a passive reflective element configured to reflect a light beam from an emitting element(s) of the first light stick to a receiving element(s) of the first light stick). The light sticks may, for example, each be provided with emitting and receiving elements (for example, a pair of light sticks each provided with an emitter optoelectronic array and a receiver optoelectronic array).

An installer may, by way of example and not limitation, attach the light stick(s) to a (preinstalled) mount (e.g., on a floor, on a wall, on a piece of equipment). The installer may, for example, align the light stick(s) with a mark(s), such as indicating a desired orientation. The installer may, for example, project a laser line between the two light sticks and manipulate the light sticks into (approximate) visual alignment with them using his unaided eye.

In a step 1305, an alignment unit is pluggably coupled to each light stick along a respective longitudinal axis of the light stick. For example, the installer may attach the alignment unit(s) to the light stick(s) after the step 1305. The installer may attach the alignment unit(s) to the light stick(s) before the step 1305.

At least one emitter of at least a first alignment unit of the alignment units is then activated in a step 1310. The emitter may, for example, be activated by an input from the installer. The input from the installer may, by way of example and not limitation, be provided by operation of the button 550, by operation of the touch input and indication module 130, by operation of a remote-control unit to send a command signal(s) to at least one communication module (not shown) of the alignment unit(s), or some combination thereof.

In a decision point 1315, if an indicium is generated on the opposing alignment unit (e.g., by an emitted light from the first alignment unit reflecting on an indicator module), then the method 1300 proceeds to a decision point 1325. If the indicium is not generated on the opposing alignment unit, then the installer manipulates the light stick to which is coupled the (emitting) first alignment unit in a step 1320 until the indicium is generated.

Once the indicium is determined to be generated in the decision point 1315, then it is determined (e.g., by the installer) if the indicium indicates alignment of the emitting alignment unit with the opposing alignment unit in the decision point 1325. If not, then the light stick to which is coupled the first (emitting) alignment module is manipulated in a step 1330 until alignment is achieved.

Once alignment is determined to be achieved in the decision point 1325, then final alignment is performed in a step 1335. The final alignment may, by way of example and not limitation, include performing a precision alignment process guided by an automatic alignment system of the first and/or second light sticks. Once final alignment is performed in the step 1335, then the emitter(s) is deactivated in a step 1340. In some embodiments the method 1300 may, for example, be repeated and/or be performed in parallel for at least the second light stick. The method 1300 may, for example, advantageously provide for rapid, guided alignment of two optoelectronic units without undue and/or frustrating 'guesswork' manipulation trying to achieve a (predetermined) level of alignment suitable for alignment and/or for performing a final (precision) alignment method.

Figure 14:
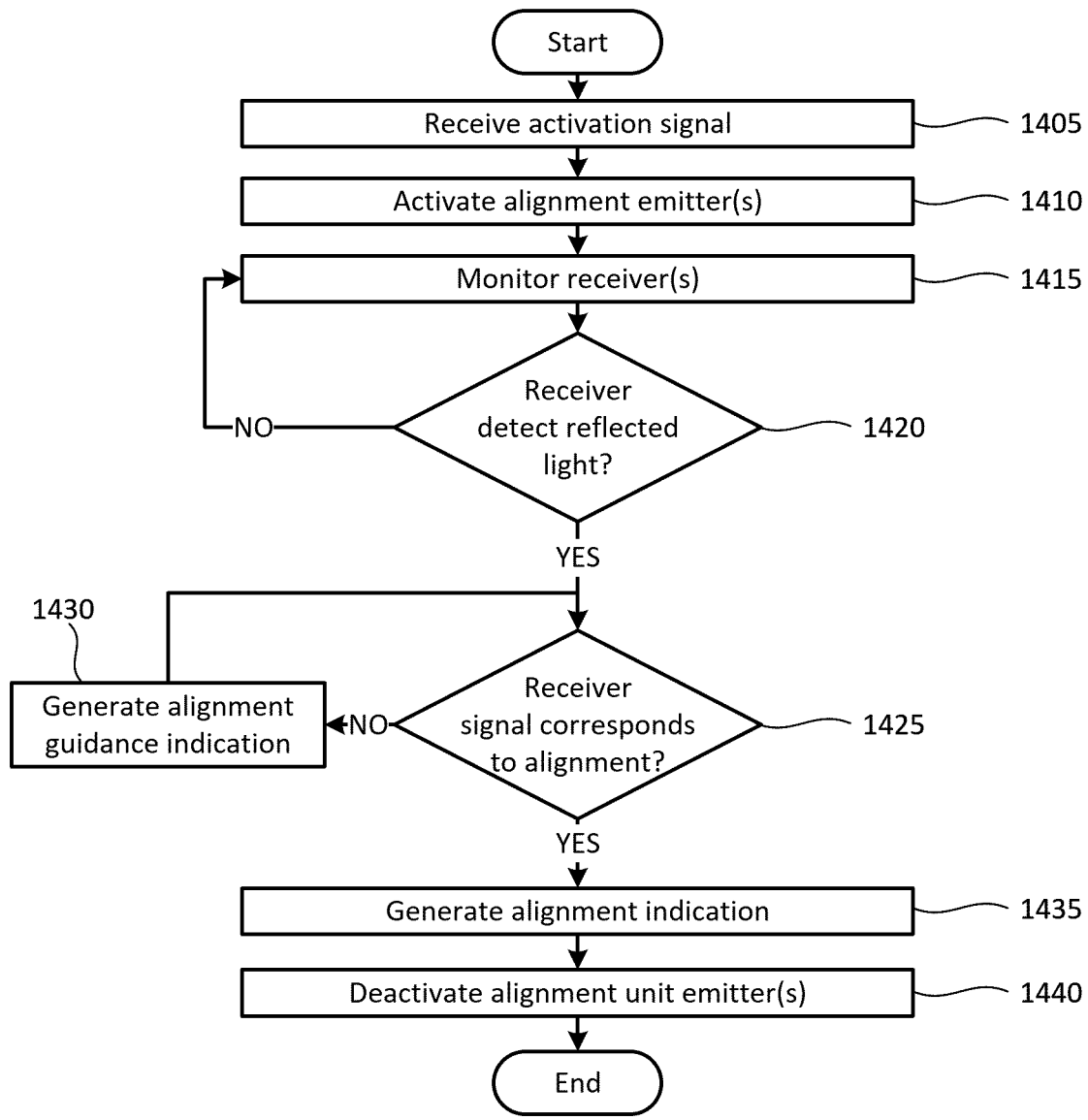
FIG. 14 depicts an exemplary method of operation of a PAM.

FIG. 14 depicts an exemplary method of operation of a PAM. A method 1400 begins by receiving an activation signal in a step 1405. The method 1400 may, by way of example and not limitation, be performed by a controller such as, for example, is disclosed at least with reference to the controller 310 of FIG. 3. Once the activation signal is received, at least one emitter (e.g., emitter 315) is activated in a step 1410. A receiver (e.g., receiver 330) is monitored (e.g., by the controller 310) in a step 1415. For example, the receiver may be monitored for detection of an incoming electromagnetic signals (e.g., an optical beam such as a laser beam). Once it is determined in a decision point 1420 that the receiver has detected reflected light, it is then determined in a decision point 1425 whether the corresponding receiver signal(s) corresponds to alignment of the associated alignment units (e.g., indicating alignment of the associated optoelectronic units).

If the receiver signal does not correspond to alignment, and alignment guidance indication (e.g., at least one visual indicium) is generated in a step 1430 (e.g., by the indicator module 335. The indication may, for example, be configured to guide an installer (e.g., by signals configured to light optical emitters providing directional feedback) in manipulating an alignment unit (e.g., by manipulation of an attached optoelectronic unit) into alignment. Once the received signal is determined in the decision point 1425 to correspond to alignment, then at least one alignment indication (e.g., visual, audible, tactile) is generated in a step 1435. The emitter(s) is then deactivated in a step 1440.

Although various embodiments have been described with reference to the figures, other embodiments are possible. For example, although exemplary systems have been described with reference to the figures, other implementations may be deployed in other industrial, scientific, medical, commercial, and/or residential applications.

In various embodiments, an indicator module (e.g., indicator module 150 as disclosed at least with reference to FIG. 1) may include reflective material. The reflective material may, for example, include a reflective foil. The foil may, for example, be die-cut reflective tape. The reflective material may, for example, be configured as a corner cube (retro-) reflector configured to scatter an impinging optical beam (e.g., laser beam) such that the reflected light is (more) visible.

Various embodiments may, for example, be configured such that an indicator module provides a wide viewing angle. In some embodiments a wide viewing angle may, by way of example and not limitation, be at least 5° on either side of an axis of an impinging optical beam. In some embodiments a wide viewing angle may, for example, be at least 10°. The wide viewing angle may, for example, be at least 15°. The wide viewing angle may, for example, be at least 20°. The wide viewing angle may, for example, be at least 25°. In some embodiments a viewing angle of an indicator module of an alignment module may be configured, for example, to be substantially between 10-25° relative to an optical axis of an optoelectronic unit to which the alignment module is (releasably) coupled. In various embodiments, a wide viewing angle may advantageously enhance visibility of the emitted light beam reflecting off an opposing alignment module during an alignment process. Accordingly, an operator may advantageously stand at one optoelectronic unit and manipulate it into alignment while watching the indicator module of the opposing alignment unit, without having to have a second person, or walk over to the opposing alignment unit to see the reflection of the emitted beam.

In various embodiments, a predetermined near-alignment range may, by way of example and not limitation, correspond to a predetermined range of alignment between two photoelectric units (e.g., light sticks). The near-alignment range may, for example, include a range of 'misalignment' between respective optical axes of the two units that is greater than a minimum alignment necessary to use an automatic alignment system (e.g., integrated into one or both of the units) and less than an ability of a user to visually align the two optical axes (e.g., by 'eyeballing' them visually straight with each other). As an illustrative example, if an automatic alignment system requires, by way of example and not limitation, no more than 5° of misalignment between the two optical axes, but a user cannot visually align them unaided, for example, closer than about 15°, the near-alignment range may include at least from 5° to 15°. In some implementations, by way of example and not limitation, the near-alignment range may at least partially overlap the other two ranges (e.g., 4° to 16° in the preceding illustrative example). Such implementations may, for example, advantageously ensure a smooth transition from unaided alignment to near-alignment to precision alignment.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as 1.5V and/or 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a light emitting diode (LED), CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an exemplary aspect, an alignment system may include an alignment source module configured to releasably couple to a first unit of a pair of optoelectronic arrays such that the alignment source module is oriented to emit an optical beam in substantial alignment with a first optical axis of the first unit. The alignment system may include an alignment indicator module configured to releasably couple to a second unit of the pair of optoelectronic arrays such that the alignment indicator module provides a visible indication when the optical beam is within a predetermined near-alignment orientation range relative to a second optical axis of the second unit. Each of the alignment source module and the alignment indicator module may be configured to axially couple along a longitudinal axis of the respective unit of the pair of optoelectronic arrays, the longitudinal axis being substantially parallel with an array of optical elements of the respective unit. The alignment source module may be configured to be in pluggable electrical connection with the first unit.

The alignment source module may further include a switch operably coupled to the alignment source module and configured to selectively activate the optical beam. The switch may be operably coupled to a touch input. Operating the touch input may toggle an activation and a deactivation of the optical beam.

The alignment source module may include a second alignment indicator module.

The alignment indicator module may include a second alignment source module.

The visible indication of the alignment indicator module may be observable from a wide viewing angle relative to the second optical axis. The wide viewing angle may be at least 10 degrees on either side of the second optical axis.

In an exemplary aspect, an alignment system may include an alignment source module configured to releasably couple to a first unit of a pair of optoelectronic arrays such that the alignment source module is oriented to emit an optical beam in substantial alignment with a first optical axis of the first unit. The alignment system may include an alignment indicator module configured to releasably couple to a second unit of the pair of optoelectronic arrays such that the alignment indicator module provides a visible indication when the optical beam is within a predetermined near-alignment orientation range relative to a second optical axis of the second unit. Each of the alignment source module and the alignment indicator module may be configured to axially couple along a longitudinal axis of the respective unit of the pair of optoelectronic arrays, the longitudinal axis being substantially parallel with an array of optical elements of the respective unit.

The alignment source module may be configured to be in pluggable electrical connection with the first unit. The alignment source module may include a switch operably coupled to the alignment source module and configured to selectively activate the optical beam. The switch may be operably coupled to a touch input. Operating the touch input may toggle an activation and a deactivation of the optical beam.

The alignment source module may include a light emitting indicator module configured to generate at least one visual indicium in response to activation of the optical beam. The light emitting indicator module may include a touch input.

The alignment source module may include a second alignment indicator module.

The alignment indicator module may include a second alignment source module. The alignment source module may be a first alignment source module and may include a light emitting indicator module configured to generate at least one visual indicium in response to detection of an optical beam from the second alignment source module.

The alignment indicator module may include at least one reflective surface configured to generate the visible indication in response to the optical beam contacting the at least one reflective surface. The visible indication of the alignment indicator module may be observable from a wide viewing angle relative to the second optical axis.

The wide viewing angle may be at least 10 degrees on either side of the second optical axis.

At least one of the alignment indicator module and the alignment source module may include a pass-through connector module.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An alignment system comprising:
    an alignment source module configured to releasably couple to a first unit of a pair of optoelectronic arrays such that the alignment source module is oriented to emit an optical beam in substantial alignment with a first optical axis of the first unit; and,
    an alignment indicator module configured to releasably couple to a second unit of the pair of optoelectronic arrays such that the alignment indicator module provides a visible indication when the optical beam is within a predetermined near-alignment orientation range relative to a second optical axis of the second unit,
    wherein:
        the predetermined near-alignment orientation range comprises angles outside of a precision alignment range defined by the pair of optoelectronic arrays,
        each of the alignment source module and the alignment indicator module is configured to axially couple along a longitudinal axis of the respective unit of the pair of optoelectronic arrays, the longitudinal axis being substantially parallel with an array of optical elements of the respective unit, and,
        the alignment source module is configured to be in pluggable electrical connection with the first unit and physically removable from the first unit prior to a precision alignment.

2. The alignment system of claim 1, wherein the alignment source module further comprises a switch operably coupled to the alignment source module and configured to selectively activate the optical beam.

3. The alignment system of claim 2, wherein the switch is operably coupled to a touch input, wherein operating the touch input toggles an activation and a deactivation of the optical beam.

4. The alignment system of claim 1, wherein the alignment source module further comprises a second alignment indicator module.

5. The alignment system of claim 1, wherein the alignment indicator module further comprises a second alignment source module.

6. The alignment system of claim 1, wherein the visible indication of the alignment indicator module is observable from a wide viewing angle relative to the second optical axis.

7. The alignment system of claim 6, wherein the wide viewing angle is at least 10 degrees on either side of the second optical axis.

8. An alignment system comprising:
    an alignment source module configured to releasably couple to a first unit of a pair of optoelectronic arrays such that the alignment source module is oriented to emit an optical beam in substantial alignment with a first optical axis of the first unit; and,
    an alignment indicator module configured to releasably couple to a second unit of the pair of optoelectronic arrays such that the alignment indicator module provides a visible indication when the optical beam is within a predetermined near-alignment orientation range relative to a second optical axis of the second unit,
    wherein:
        the predetermined near-alignment orientation range comprises a range of misalignment angles larger than a predetermined precision orientation range defined by a precision alignment module external to the alignment source module, the precision alignment module being configured to perform a subsequent precision alignment process, and,
        each of the alignment source module and the alignment indicator module is configured to axially couple along a longitudinal axis of the respective unit of the pair of optoelectronic arrays, the longitudinal axis being substantially parallel with an array of optical elements of the respective unit.

9. The alignment system of claim 8, wherein the alignment source module is configured to be in pluggable electrical connection with the first unit.

10. The alignment system of claim 8, wherein the alignment source module further comprises a switch operably coupled to the alignment source module and configured to selectively activate the optical beam.

11. The alignment system of claim 10, wherein the switch is operably coupled to a touch input, wherein operating the touch input toggles an activation and a deactivation of the optical beam.

12. The alignment system of claim 8, wherein the alignment source module further comprises a light emitting indicator module configured to generate at least one visual indicium in response to activation of the optical beam.

13. The alignment system of claim 12, wherein the light emitting indicator module further comprises a touch input.

14. The alignment system of claim 8, wherein the alignment source module further comprises a second alignment indicator module.

15. The alignment system of claim 8, wherein the alignment indicator module further comprises a second alignment source module.

16. The alignment system of claim 15, wherein the alignment source module is a first alignment source module and further comprises a light emitting indicator module configured to generate at least one visual indicium in response to detection of an optical beam from the second alignment source module.

17. The alignment system of claim 8, wherein the alignment indicator module comprises at least one reflective surface configured to generate the visible indication in response to the optical beam contacting the at least one reflective surface.

18. The alignment system of claim 8, wherein the visible indication of the alignment indicator module is observable from a wide viewing angle relative to the second optical axis.

19. The alignment system of claim 18, wherein the wide viewing angle is at least 10 degrees on either side of the second optical axis.

20. The alignment system of claim 8, wherein at least one of the alignment indicator module and the alignment source module comprise a pass-through connector module.

21. The alignment system of claim 8, wherein the precision alignment module is integrated into the pair of optoelectronic arrays.

* * * * *